Patented Oct. 25, 1949

2,485,903

UNITED STATES PATENT OFFICE 2,485,903

VII TYPE PHOSPHOR

Neville F. Miller, Palmerton, Pa., assignor, by mesne assignments, to the United States of America as represented by the Secretary of the Navy No Drawing. Application March 3, 1948,
Serial No. 12,889

5 Claims. (Cl. 252—301.4)

This invention relates to infrared sensitive phosphors and to the particular composition of a Type VII phosphor whose sensitivity to infrared rays is relatively permanent. The object of the invention is to obtain a Standard VII phosphor in the form of a fine powder of high infrared sensitivity. This is accomplished by "underfluxing" and adding lead as a third activator to restore the general level of luminescent properties to the level characteristic of fully sintered Standard VII type phosphors.

As normally formulated, with fluxing salts in the range of 10 per cent by weight, both Standard VI phosphors (Eu-Sm activated) and Standard VII phosphors (Ce-Sm activated) form strongly cemented products on muffling at 1000° C. These standard phosphors thus prepared cannot be reduced to powders without serious loss in infrared response. By reducing the total flux to 2-4 per cent and adding an antiflux (7.3–16.0 per cent MgO or $MgCO_3$) Standard VI type phosphors may be prepared as weakly cemented products which suffer negligible loss in infrared sensitivity on crushing to pass 200-mesh screens.

Standard VII type phosphors are more sensitive to crushing than Standard VI type phosphors and it is found in practice that the most cementing flux component (lithium fluoride) must be reduced to about 0.6 per cent of the total strontium components (calculated as SrS) in order to obtain muffled products which suffer negligible loss in infrared sensitivity on crushing. This reduced LiF concentration is accompanied by a loss in fluorescence, phosphorescence, and infrared response to a degree which indicates "underfluxing" of the phosphors.

However, I have found that the use of lead as a third activator with cerium and samarium in these "underfluxed" phosphors restores the general level of luminescent properties (fluorescence, phosphorescence, and infrared response) to the level characteristic of fully sintered Standard VII type phosphors.

Since the new Standard VII type phosphors are "underfluxed" they are very loosely cemented and may be reduced to fine powders by crushing without noticeable loss in infrared response.

It should be noted that the preparation of these new Standard VII type phosphors requires a low amount of flux (no more than 0.6 per cent lithium fluoride), a relatively large amount of antiflux (approximately 15.7 per cent $MgCO_3$) and definite concentrations of three activating elements; lead, cerium, and samarium. The reduced flux and the antiflux insure "undermuffling" to the desired degree of softness while the three activators in their specified concentrations produce luminescent properties in these "underfluxed" phosphors at levels characteristic of fully sintered Standard VII type phosphors.

Preparation of phosphors

The optimum concentrations, for high infrared sensitivity, in these new Pb-Ce-Sm phosphors are given in Table 1 below.

Table 1.—*Optimum formulation for friable and infrared sensitive Standard VII type phosphors*

| Activating salts: | Wt. in grams | |
|---|---|---|
| Lead acetate .3 $H_2O$ | 0.00025 | =0.0019% Pb based on 8.3 gm. SrS |
| Cerium oxide [1] | 0.0050 | =0.051% Ce based on 8.3 gm. SrS |
| Samarium chloride [2] | 0.00010 | =0.00050% Sm based on 8.3 gm. SrS |
| Fluxing salts: | | |
| $Li_2SO_4$ (anhydrous) | 0.05 | |
| LiF | 0.05 | |
| $CaHPO_4$ | 0.05 | |
| Strontium components: | | |
| $SrCO_3$ | 2.5 | =2.0 SrS |
| SrS | 6.3 | +6.3 |
| | | 8.3 SrS |
| Antiflux: | | |
| $MgCO_3$ | 1.3 | |
| Sulfur | 2.0 | |

[1] The cerium oxide used was an oxidation product of cerium metal and probably was $Ce_2O_3$. The 0.0050 gram cerium oxide can be replaced with 0.016 gram ammonium tetrasulfato cerate without changing the luminescent properties or the infrared sensitivity of these phosphors.
[2] Water of hydration not definitely known. The salt used was probably $SmCl_3.6H_2O$.

The components of the composition given hereinabove are in gram weight totaling 12.25535 grams. Calculated in terms of parts per hundred or percentage the component values are as follows: lead acetate 0.0020, cerium oxide 0.0408, samarium chloride 0.0008, lithium sulphate 0.4079, lithium fluoride 0.4079, calcium acid phosphate 0.4079, strontium carbonate 20.3980, strontium sulphide 51.4061, sulphur 16.3204, magnesium carbonate 10.6082.

In preparing these Pb-Ce-Sm phosphors the salts of the three activators and the three fluxing salts are ground together in a glass mortar with a few cubic centimeters of alcohol; the $SrCO_3$ and SrS are then added and ground to form a paste. The antiflux ($MgCO_3$) is added and grinding is continued to obtain a uniform mixture. This mixture is dried in an oven at 100° C. and the sulfur is then ground in. The entire mixture is muffled 25 minutes at 1000° C. in an atmosphere of nitrogen and is then allowed to cool in nitrogen. Phosphors thus prepared may be crushed to pass a 200-mesh silk bolting cloth screen without serious loss in infrared sensitivity and the general level of luminescent properties (fluorescence, phosphorescence, and infrared response) of the powders are practically identical with those characteristic of a fully sintered Standard VII phosphor before grinding.

It is probable that other combinations of fluxing salts and antifluxes than those given in Table 1 would yield phosphors of the desired softness and high infrared sensitivity if used with these three activators in the specified concentrations. The use of different salts of the three activating elements than those specified would probably not alter the softness or infrared sensitivity of the finished phosphors.

Such changes in formulation would not depart from the purpose of the invention which is to obtain a soft Standard VII type phosphor by "underfluxing" and to counteract the effect of underfluxing on infrared sensitivity by the use of three activators, lead, cerium, and samarium, employed in definite, specified, concentrations.

My investigation has shown that salts of three other elements; namely, thallium, tantalum, and indium, restore to some degree, the infrared response of underfluxed Ce-Sm phosphors if used in place of lead and at about the same concentration specified for lead. However, the effects of these three elements are relatively weak when compared with the effect of lead.

What is claimed is:

1. A VI type phosphor highly sensitive to infrared radiation and characterized by the ability to be readily reduced to a fine powder without loss of sensitivity after sintering comprising the product of heat treating at 1000° C. in an atmosphere of nitrogen a mixture consisting in parts per hundred based on the weight of the total strontium components calculated as strontium sulphide of:

Activating salts:
| | |
|---|---|
| Lead acetate | 0.0020 |
| Cerium oxide | 0.0408 |
| Samarium chloride | 0.0008 |

Fluxing salts:
| | |
|---|---|
| Lithium sulphate | 0.4079 |
| Lithium fluoride | 0.4079 |
| Calcium acid phosphate | 0.4079 |

Body components:
| | |
|---|---|
| Strontium carbonate | 20.3980 |
| Strontium sulphide | 51.4061 |
| Sulphur | 16.3204 |

And antiflux component:
| | |
|---|---|
| Magnesium carbonate | 10.6082 |
| Total | 100.0000 |

2. A VII type phosphor highly sensitive to infrared radiation and characterized by the ability to be readily reduced to a fine powder without loss of sensitivity after sintering comprising the product of heat treating at 1000° C. in an atmosphere of nitrogen a mixture consisting in parts per hundred based on the weight of the total strontium components calculated as strontium sulphide of:

Activating salts:
| | |
|---|---|
| Thallium acetate | 0.0020 |
| Cerium oxide | 0.0408 |
| Samarium chloride | 0.0008 |

Fluxing salts:
| | |
|---|---|
| Lithium sulphate | 0.4079 |
| Lithium fluoride | 0.4079 |
| Calcium acid phosphate | 0.4079 |

Body components:
| | |
|---|---|
| Strontium carbonate | 20.3980 |
| Strontium sulphide | 51.4061 |
| Sulphur | 16.3204 |

And antiflux component:
| | |
|---|---|
| Magnesium carbonate | 10.6082 |
| Total | 100.0000 |

3. A VII type phosphor highly sensitive to infrared radiation and characterized by the ability to be readily reduced to a fine powder without loss of sensitivity after sintering comprising the product of heat treating at 1000° C. in an atmposphere of nitrogen a mixture consisting in parts per hundred based on the weight of the total strontium components calculated as strontium sulphide of:

Activating salts:
| | |
|---|---|
| Tantalum acetate | 0.0020 |
| Cerium oxide | 0.0408 |
| Samarium chloride | 0.0008 |

Fluxing salts:
| | |
|---|---|
| Lithium sulphate | 0.4079 |
| Lithium fluoride | 0.4079 |
| Calcium acid phosphate | 0.4079 |

Body components:
| | |
|---|---|
| Strontium carbonate | 20.3980 |
| Strontium sulphide | 51.4061 |
| Sulphur | 16.3204 |

And antiflux component:
| | |
|---|---|
| Magnesium carbonate | 10.6082 |
| Total | 100.0000 |

4. The method of making a VII type phosphor as defined in claim 1, which is highly sensitive to infrared radiation and characterized by the ability to be readily reduced to a powder consisting of mixing and grinding together the three activators lead acetate, cerium oxide and samarium chloride with the three fluxing salts lithium sulphate, lithium fluoride and calcium acid phosphate in alcohol, adding the strontium carbonate and strontium sulphide and grinding to form a paste, adding the magnesium carbonate and grinding to form a uniform mixture, drying the mixture at 100° C. until dry, grinding in the sulphur until a uniform mixture is obtained, muffling the mixture for twenty-five minutes at 1000.0° C. in an atmosphere of nitrogen, cooling the muffled mixture in an atmosphere of nitrogen and grinding the cooled mixture to a fineness sufficient to pass through a 200-mesh silk bolting cloth.

5. A VII type phosphor highly sensitive to infra-red radiation and characterized by the ability to be readily reduced to a fine powder without loss of sensitivity after sintering, comprising the product of heat treating at 1000° C. in an atmosphere of nitrogen a mixture consisting of 0.0408% cerium oxide, 0.0008% samarium chloride and 0.0020% of one member selected from the group of salts consisting of lead acetate, thallium acetate, tantalum acetate and indium acetate, a group of fluxing salts consisting of lithium sulphate, lithium fluoride, and calcium acid phosphate in amounts reduced over that normally required for a VII type phosphor, a group of body components consisting of 20.3980% strontium carbonate, 51.4061% strontium sulphide, and 16.3204% sulphur, and an antiflux component consisting of 10.6082% magnesium carbonate for controlling the refractoriness of the composite phosphor, the percentages of activators and antifluxes being based on the weight of the total strontium components calculated as strontium sulphide.

NEVILLE F. MILLER.

No references cited.